(No Model.) 2 Sheets—Sheet 1.

O. J. MASON.
MACHINE FOR MAKING CLAY SMOKING PIPES.

No. 272,966. Patented Feb. 27, 1883.

WITNESSES:

INVENTOR:
O. J. Mason
BY
ATTORNEYS.

(No Model.) 2 Sheets—Sheet 2.

O. J. MASON.
MACHINE FOR MAKING CLAY SMOKING PIPES.

No. 272,966. Patented Feb. 27, 1883.

WITNESSES:

INVENTOR:
O. J. Mason
BY Munn & Co.
ATTORNEYS.

UNITED STATES PATENT OFFICE.

OLIVER J. MASON, OF TALLMADGE, OHIO.

MACHINE FOR MAKING CLAY SMOKING-PIPES.

SPECIFICATION forming part of Letters Patent No. 272,966, dated February 27, 1883.

Application filed July 11, 1882. (No model.)

*To all whom it may concern:*

Be it known that I, OLIVER J. MASON, of Tallmadge, in the county of Summit and State of Ohio, have invented a new and Improved Machine for Making Clay Smoking-Pipes, of which the following is a full, clear, and exact description.

My invention consists essentially of an endless chain of dies or molds moving intermittingly along a place for being charged with the clay for the pipes, another place where formers make the bowl and perforate the stem, another place where the molds open and discharge the pipes, and thence back to the place of being charged, together with the forming and actuating apparatus, the said machine being contrived for more rapid operation and greater capacity of production than the machines now in use for making pipes, all as hereinafter fully described.

Reference is to be had to the accompanying drawings, forming part of this specification, in which similar letters of reference indicate corresponding parts in both the figures.

Figure 1:
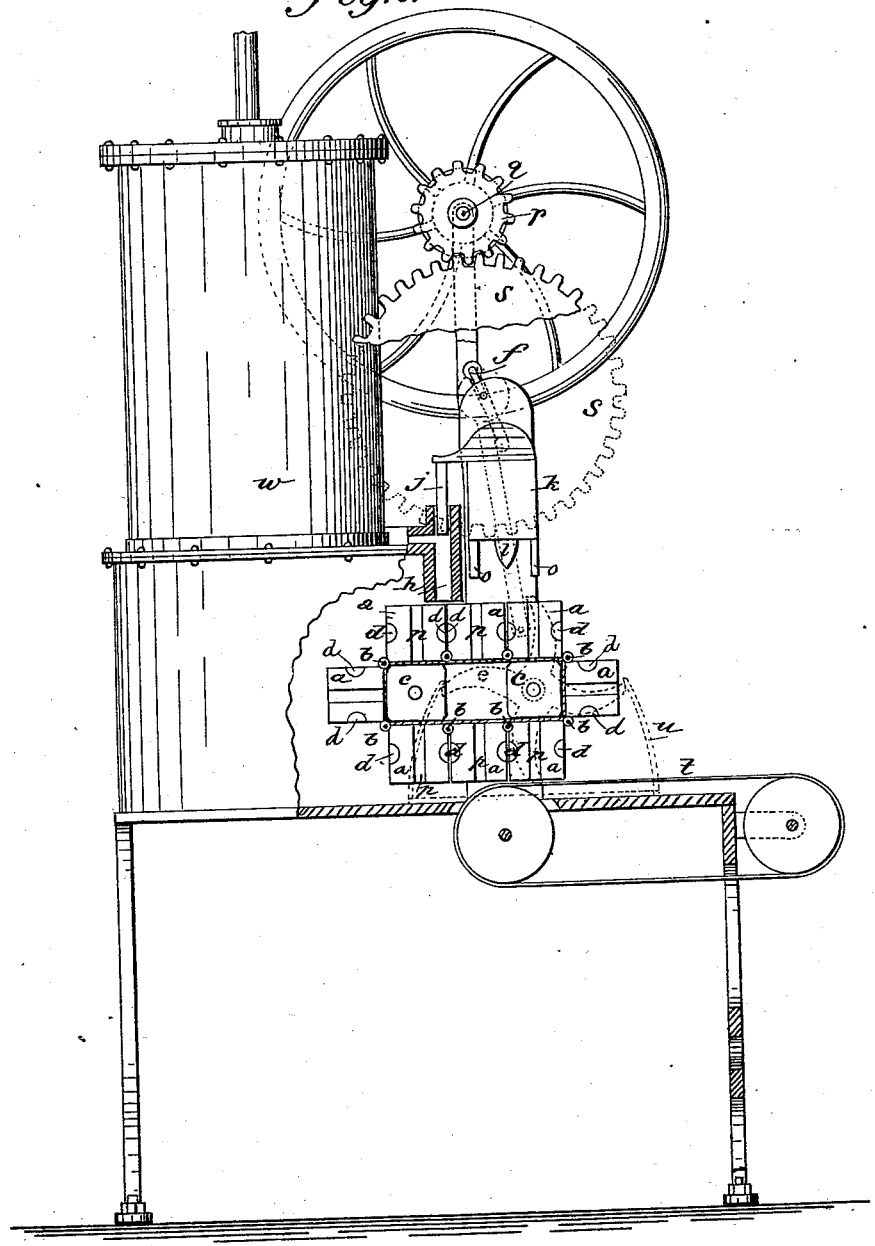
Figure 2:
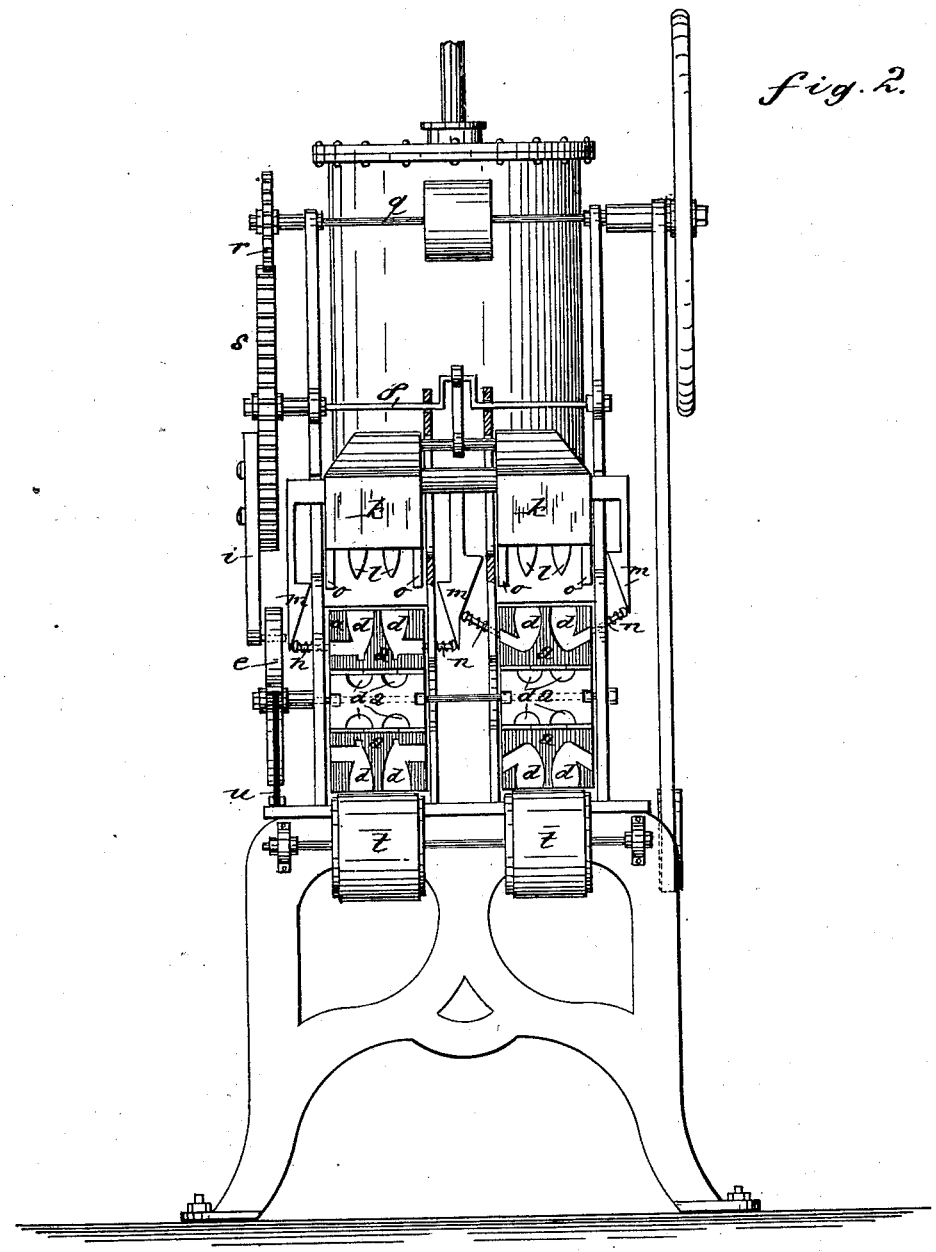

Figure 1 is partly a side elevation and partly a sectional elevation of my improved machine, and Fig. 2 a front elevation, partly sectioned.

I make one or more endless chains of square mold-blocks $a$, by hinging the blocks together at $b$, and arrange these chains on square rollers $c$, for being moved along to receive the clay and mold and deliver the pipes. Each mold-block has two half-mold cavities, $d$, in its two opposite sides, the bowl portions of which open through the tops of the blocks and the stem portions at the ends of said blocks. These cavities being in the sides of the blocks that are hinged together, it follows that when the blocks are passing along their course between the carrying-rollers the cavities of the adjacent sides of the blocks form complete molds, and when passing around the rollers at the ends of the course the joints between the blocks will open so that the molded pipes may be discharged. These chains of molds, being geared by the four-armed wheel $e$ to be shifted the breadth of one block at each revolution of the crank-shaft $f$ by an arm, $i$, thereon, are made to pass under the charging-spout $h$, to which the clay is supplied by any approved means from the mill $w$, and from which the requisite quantity is driven down into the molds successively by the plungers $j$, attached to the cross-head $k$. From the chargers the molds pass under bowl-formers $l$, attached to cross-head $k$, which descend into the charged molds and form the bowls at the same time that the plungers are charging the next molds. The cross-head also carries inclined pushers $m$, which at the same time force in the stem-formers and perforators $n$, and they also carry bars $o$, that pass down in the grooves $p$ in the ends of the mold-blocks and hold them against opening at the joints by the pressure of the formers on the clay, each of the two blocks of a mold being thus held at the same time. The stem-formers and perforators are withdrawn by the coiled springs applied to them. Any other approved device may be used instead for that purpose. The plungers are worked by the crank-shaft $f$, to which the power is applied by the driving-shaft $q$ and toothed wheels $r s$. Where the molds open going around the right-hand roller $c$, Fig. 1, the pipes fall on endless carriers $t$, which deliver them into any suitable receptacle. The arm-wheel $e$ is provided with spring-brakes $u$, to prevent it from being thrown too far; but any other suitable stop device may be used.

In this example I have represented two chains of molds; but it is obvious that more may be employed, according to the required capacity of the machine. The form of the molds may vary according to the required forms of pipes to be produced. In this case the molds of one chain are constructed for making the stems oblique to the bowls, and the others for right-angled bowls and stems.

Having thus described my invention, what I claim as new, and desire to secure by Letters Patent, is—

1. In a machine for making clay smoking-pipes, a series of mold-blocks hinged together to form an endless chain, and each having two half-mold cavities in its opposite sides, substantially as herein shown and described.

2. A series of mold-blocks hinged together to form an endless chain, and each having two half-mold cavities in its opposite sides, the bowl portions of which open through the top and the stem portions at the ends of the blocks, substantially as herein shown and described.

3. The combination, with the series of mold-blocks $a$, hinged together and having the mold-cavities $d$ in their sides, of the rollers $c$, an means, substantially as herein shown, for operating said rollers, as and for the purpose set forth.

4. The combination, with the series of mold-blocks $a$, hinged together and having the mold-cavities $d$ in their sides, and the crank-shaft $f$, provided with the arm $i$, of the rollers $c$, the four-armed wheel $e$, and the spring-brake $u$, substantially as and for the purpose set forth.

5. The combination of the holding-bars $o$ on the cross-heads with the jointed pipe-molds having grooves $p$ in the ends, substantially as described.

6. The combination of the inclined bars $m$ on the cross-head with the stem-formers $n$ and the pipe-molds, substantially as described.

7. The combination of the endless chain of pipe-molds, rotating carriers for said molds, arm-wheel for working the carriers, and an arm of the plunger driving shaft to work the said arm-wheel, substantially as described.

8. The combination, with the series of mold-blocks $a$, hinged together to form an endless chain, and having mold-cavities $d$ in their sides, and mechanism for operating the same, of the endless carrier $t$, substantially as and for the purpose set forth.

OLIVER J. MASON.

Witnesses:
W. B. COLLOM,
J. A. COLLOM.